US008382998B2

(12) United States Patent
Wang

(10) Patent No.: US 8,382,998 B2
(45) Date of Patent: Feb. 26, 2013

(54) PROCESS OF MANUFACTURING A THREE-DIMENSIONAL RELIEF ON A METAL SURFACE

(76) Inventor: Kuo-Tasi Wang, Tainan Hsien (TW)

( * ) Notice: Subject to any disclaimer, the term of this patent is extended or adjusted under 35 U.S.C. 154(b) by 191 days.

(21) Appl. No.: 12/983,694

(22) Filed: Jan. 3, 2011

(65) Prior Publication Data

US 2012/0168403 A1 Jul. 5, 2012

(51) Int. Cl.
*C03C 25/68* (2006.01)

(52) U.S. Cl. ........................................... 216/54; 216/28

(58) Field of Classification Search .................... 216/28, 216/54, 55, 33, 36, 32
See application file for complete search history.

(56) References Cited

U.S. PATENT DOCUMENTS 6,699,397 B1 * 3/2004 Chen .............................. 216/54

* cited by examiner

*Primary Examiner* — Roberts Culbert
(74) *Attorney, Agent, or Firm* — J.C. Patents

(57) ABSTRACT

A process of manufacturing a three-dimensional relief on a metal surface includes steps of preparing a water transfer label, transferring, roasting, electro-plating and removing. An anti-corrosion pattern ink layer of the water transfer label is first transferred onto a metal surface and then roasted and dried with high temperature for covering a part of the metal, which will not be etched by electro-plating, but the other part of the metal not covered by the pattern ink layer will be etched and colored. Thus, after the pattern ink layer is removed, the part of the metal covered by the pattern ink layer will present a bulgy state and possess original color that is different from the color of the other part of the metal not covered by the pattern ink layer, attaining a three-dimensional visual esthetic sense.

3 Claims, 1 Drawing Sheet

PROCESS OF MANUFACTURING A THREE-DIMENSIONAL RELIEF ON A METAL SURFACE

BACKGROUND OF THE INVENTION

1. Field of the Invention

This invention relates to a process of manufacturing a three-dimensional relief on a metal surface, particularly to one in which a pattern ink layer of a water transfer label is transferred onto a metal surface, and roasted and dried with high temperature and then electro-plated to produce a three-dimensional relief with visual esthetic sense.

2. Description of the Prior Art

Generally, for elevating external esthetic sense of merchandise, an ink layer of printing patterns is directly transferred onto the surface of the merchandise by means of a water transfer label. A common water transfer label is orderly provided thereon with a base paper, an adhering layer, an ink layer, a glossy protective layer and a separable paper. In using, the separable paper is first peeled off and the water transfer label is soaked in water to let the base paper also stripped off and the adhering layer produce adhesiveness and then, the ink layer and the glossy protective layer are stuck to the surface of the merchandise by means of the adhering layer and after they are dried, beautiful appearance of the patterns of the ink layer will be presented. However, the conventional patterns on the surface of merchandise are mostly flat, lack of three-dimensional effects and sense of multi-level and notability, thus impossible to stimulate people's desire to buy. Further, the ink layer that is stuck only by the adhesiveness of the adhering layer is likely to peel off and, if the surface of merchandise is uneven, the ink layer is impossible to be tightly and closely stuck for long. Furthermore, if the surface of the merchandise is polygonal, it is necessary to take lots of procedures to stick the ink layer to the surface of the merchandise one by one, not only increasing manufacturing cost and wasting lots of time but also increasing unqualified percentage in processing.

SUMMARY OF THE INVENTION

The objective of this invention is to offer a process of manufacturing a three-dimensional relief on a metal surface, provided with an anti-corrosion pattern ink layer able to be transferred to a flat, an uneven or a polygonal metal surface. After being transferred to a metal surface, the pattern ink layer is roasted and dried with high temperature and then electro-plated to produce a three-dimensional relief with esthetic sense, effectively simplifying manufacturing processes and elevating qualified percentage of products.

The process of manufacturing a relief on a metal surface in the present invention includes steps of making a water transfer label in advance, transferring, roasting, electro-plating and removing. The water transfer label is provided with an anti-corrosion pattern ink layer to be first transferred onto a metal surface, and then roasted and dried for covering a part of the metal, which should be avoided from being etched by electro-plating. Therefore, only the other part of the metal, which is not covered by the pattern ink layer, will produce etching and coloring in the course of the electro-plating. After the pattern ink layer is removed, the part of the metal covered by the pattern ink layer will present a bulgy state and possess original color that is different from the color of the other part of the metal not covered by the pattern ink layer.

Thus, by having the pattern ink layer first covered on the part of a metal so that, after electro-plating, this part of the metal will become bulgy and maintain original color that is different from the color of the other part of the metal, able to increase esthetic sense of the three-dimensional relief on the metal surface. Further, the process of this invention can be applied to a flat, an uneven or a polygonal metal surface, able to simplify manufacturing steps, economize manufacturing cost, shorten man-hour and effectively heighten qualified percentage of products.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
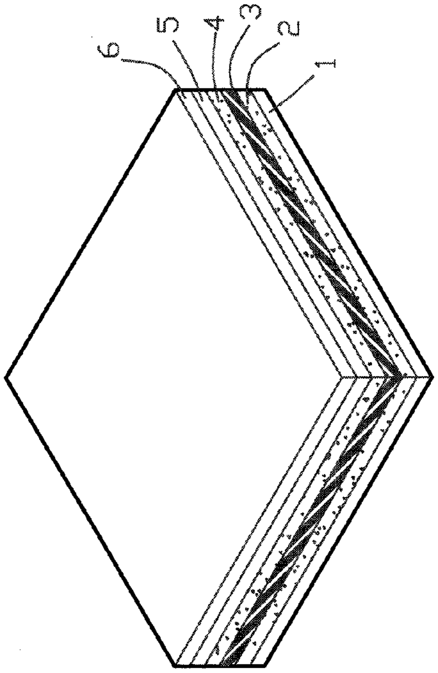
FIG. 1 is a cross-sectional view of a water transfer label prepared in advance in the present invention.

A preferred embodiment of a process of manufacturing three-dimensional relief on s metal surface in the present invention, as shown in FIG. 1 includes the following steps:

A first step, referring to FIG. 1, is preparation of a water transfer label composed of a base paper 1 orderly printed thereon with an adhesive layer 2 with adhesive property, an anti-corrosion pattern ink layer 3, a glossy protective layer 4, an ink fixing plastic film 5 and a separable paper 6 combined together. The water transfer label is made by roasting for 20 minutes and drying at low temperature of 80° C.

Figure 2:
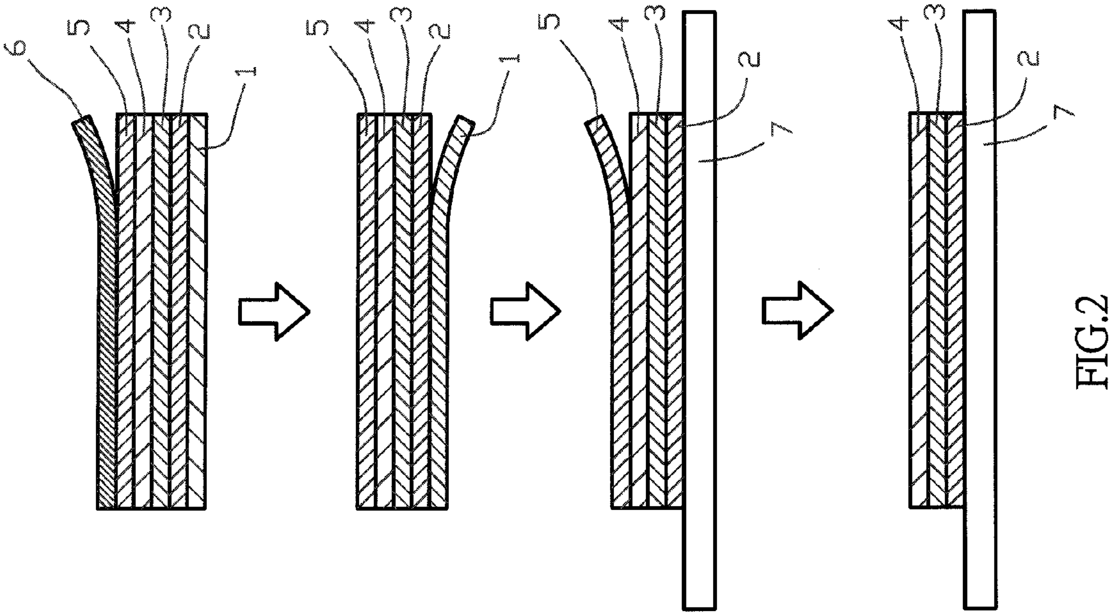
FIG. 2 is a cross-sectional view of the water transfer labels during a transferring process in the present invention.

A second step is transferring, as shown in FIG. 2. Firstly, the separable paper 6 of the water transfer label is peeled off and then the water transfer label is soaked in water for ten minutes to let the base paper 1 removed from the adhesive layer 2 and the adhesive layer 2 then produce adhesiveness. Afterward, take out the soaked water transfer label and stick it to the surface of a metal 7 by means of the adhesive layer 2 and then use a scraper to scrape away superfluous water and air on the surfaces of both the adhesive layer 2 and the metal 7 at the location of the ink fixing plastic film 5 and then tear and take off the ink fixing plastic film 5.

A third step is roasting and drying. The metal 7 and the adhesive layer 2 stuck to the metal surface together with the pattern ink layer 3 are roasted for thirty minutes with high temperature of 120° C.-180° C. to let them dried completely and stuck steadily to the surface of the metal 7.

A fourth step is electro-plating. After being dried completely, the metal 7, the adhesive layer 2 and the pattern ink layer 3 undergo metal plating and etching. In the course of plating, a part of the metal 7, which is covered by the pattern ink layer 3 will not be etched during plating, but the other part of the metal 7 not covered by the pattern ink layer 3 will be etched and colored.

A fifth step is removing. After electro-plating, the adhesive layer 2, the pattern ink layer 3 and the gold size protective layer 4 are removed from the surface of the metal 7, letting the part of the metal 7 covered by the pattern ink layer 3 present a bulgy state and possess original color that is different from the color of the other part of the metal 7 not covered by the pattern ink layer 3.

To sum up, the process of manufacturing a three-dimensional relief on a metal surface in the present invention is surely able to increase esthetic sense of the relief on a metal surface, and this technique is applicable to a flat, an uneven or a polygonal metal surface, able to simplify procedure, save manufacturing cost, shorten man-hour and effectively elevate qualified percentage of products.

While the preferred embodiment of the invention has been described above, it will be recognized and understood that various modifications may be made therein and the appended claims are intended to cover all such modifications that may fall within the spirit and scope of the invention.

What is claimed is:

1. A process of manufacturing a three-dimensional relief on a metal surface comprising following steps:

a first step of making a water transfer label in advance, said water transfer label orderly composed of a base paper, an adhesive layer, a pattern ink layer, a glossy protective layer, an ink fixing plastic film and a separable paper pasted on said ink fixing plastic film, said water transfer label heated and dried at a first temperature;

a second step of transferring, said separable paper peeled off and said base paper also stripped off, sticking said adhesive layer to a metal surface, then said ink fixing plastic film is stripped off to leave said pattern ink layer covering a part of said metal;

a third step of heating, tightly sticking said pattern ink layer to said metal by means of said adhesive layer by heating at a second temperature higher than said first temperature;

a fourth step of metal plating and etching carried out to produce etching and coloring to another part of said metal that is not covered by said pattern ink layer; and a fifth step of removing all of said adhesive layer, said pattern ink layer and said glossy protective layer from said metal surface.

2. The process of manufacturing a three-dimensional relief on a metal surface as claimed in claim 1, wherein said pattern ink layer is an anti-corrosion ink layer.

3. The process of manufacturing three-dimensional relief on a metal surface as claimed in claim 1, wherein in said heating step, said second temperature is between 120° C. and 180° C. and time for heating is thirty minutes.

* * * * *